May 18, 1937.         A. JONA         2,080,967
AIRPLANE
Filed June 28, 1934        3 Sheets-Sheet 1

INVENTOR
Alberto Jona
BY
Robert F. Davis
ATTORNEY

May 18, 1937.  A. JONA  2,080,967
AIRPLANE
Filed June 28, 1934   3 Sheets-Sheet 2

INVENTOR
*Alberto Jona*
BY
*Robert F. Davis*
ATTORNEY

Patented May 18, 1937

2,080,967

UNITED STATES PATENT OFFICE 2,080,967

AIRPLANE

Alberto Jona, Milan, Italy

Application June 28, 1934, Serial No. 732,904
In Italy July 6, 1933

2 Claims. (Cl. 244—75)

My invention relates to airplanes, seaplanes or like machines and has for its object a construction whereby the wing or wings are so connected to the fuselage as to permit a certain degree of independent relative movement between them.

The term "aircraft" or "machine" will be briefly used hereinafter to denote an airplane as well as a seaplane or any other like machine propelled through any power system, or even a glider; "wing system" or "wing" will be used to denote also any sustaining surface of the machine, including even control surfaces; and "fuselage" will be used to denote also a hull or a control cabin.

The invention substantially consists in substituting for the usual rigid connection between the wing system and the fuselage a connection comprising a hinge which allows the wings to pivot about an axis extending longitudinally of the fuselage, and providing means to automatically maintain the wings in proper flying position so as to minimize side slipping.

The invention more specifically consists in connecting a wing, or wing system to the fuselage through a hinge device which allows of the wing to be independent of the fuselage so far as the lateral tilting is concerned, and so arranged and controlling ailerons (or like control surfaces, hereinafter called the "ailerons") on the wings that when a change in the relative position between wing system and fuselage takes place the ailerons will be deflected so as to tend to tilt the wings laterally into proper position. More particularly, the ailerons have control means fastened: (a) to the rigid structure of the fuselage, or: (b) to some part on the fuselage such as a controlling device for the ailerons (control stick or steering wheel or like part) or a controlling device for the rudder.

The invention further provides means for limiting the degree of freedom in the connection between the wing and the fuselage, which means are intended to act particularly during the taxiing of the machine, that is when the ailerons have not sufficient effect to keep the wing in its correct lateral position.

When the machine is driven through a propeller, the reaction of the motive torque is dynamically or statically balanced, or may be eliminated by using two propellers revolving in opposite directions. The power plant can be mounted, however, as well on the hinged wing as on the fuselage.

The invention aims to give the aircrafts improved characteristics of stability and manoeuverability. Through the arrangement provided by the invention the following conditions exist:

1—The hinged wing is free to tilt laterally of the ship, independently from the fuselage.

2—If the hinged wing is deflected from its normal position relatively to the fuselage, the ailerons are automatically operated so as to tend to restore the wing in its normal position. Since the fuselage tends like a plumb to arrange itself in accordance with the forces exerted upon it as a result of gravity and of the turns of the aircraft and the wing is obliged by the ailerons to arrange itself at right angles to said fuselage, the hinged wing is caused to keep during the flight a correct lateral position.

The wing is said to be in "normal" position when the spread of the wing is: (a) at right angles to the central vertical plane of the fuselage, if the control cables of the ailerons are fastened to a fixed part of the fuselage; (b) at right angles to a plane determined by the lateral deflection of the control stick, if the control cables of the ailerons are fastened to the control stick; (c) at right angles to a plane determined by the deflection of the rudder bar, or like device, if the control cables of the ailerons are fastened to the control means of the rudder.

In the accompanying drawings.

Figure 1:
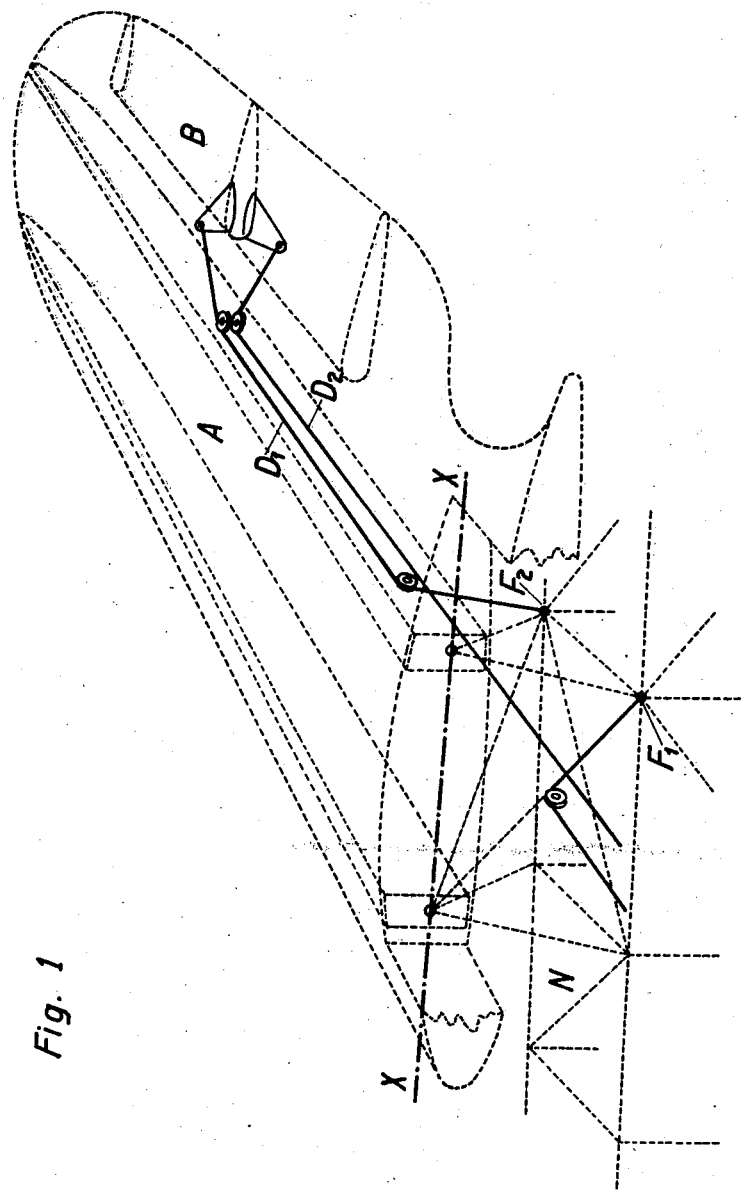
Fig. 1 shows in a purely diagrammatic manner a perspective view of the right half-wing of an aircraft embodying the invention.

Referring to Fig. 1, the half-wing A is provided with an aileron B the control cables $D_1$, $D_2$ of which are fastened to the fuselage N, being anchored to points $F_1$, $F_2$ of the same. The wing A is hinged to the fuselage through a hinge-joint the axis of which is X—X. The cables $D_1$, $D_2$ are arranged according to the customary scheme so as to actuate the ailerons; however, being fastened to fixed points of the fuselage, they are automatically controlled through the relative displacements of the wing and the fuselage. It will be readily seen from the drawings that, through this arrangement, the ailerons, owing to a change in the relative position between the wing and the fuselage, are moved in the proper direction to restore the wing to its normal position with respect to the fuselage.

Figure 2:
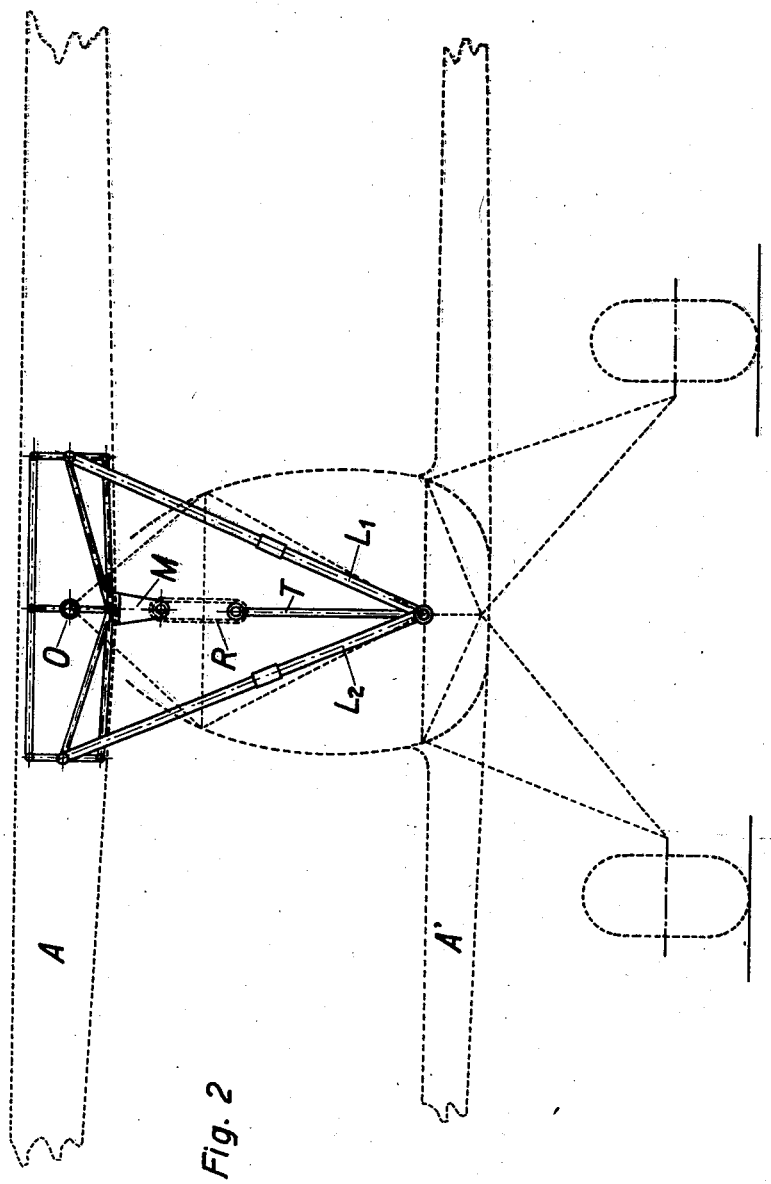
Fig. 2 is a diagrammatical frontal view of the aircraft, showing other devices provided for by the invention.

In a biplane, preferably the upper wing only is provided with the hinge-joint and the device for automatically controlling the ailerons. Such an arrangement is shown in the drawings, Figs. 2 and 3. Referring to Fig. 2, O is the centre line of the hinge which has been indicated by X—X in Fig. 1. The lower wing A' is rigidly fastened to the fuselage and is fitted with ailerons B' controlled in the customary way by the pilot. The lower (fixed) wing also provides, when the power plant is carried by the fuselage, for counteracting the reaction of the motive torque (inasmuch as this reaction can not be taken up by the upper (hinged) wing): this may be done by any of the known methods applied to the fixed wings of machines, such as by making the spread, or the incidence of one half-wing somewhat greater than that of the other.

Figure 3:
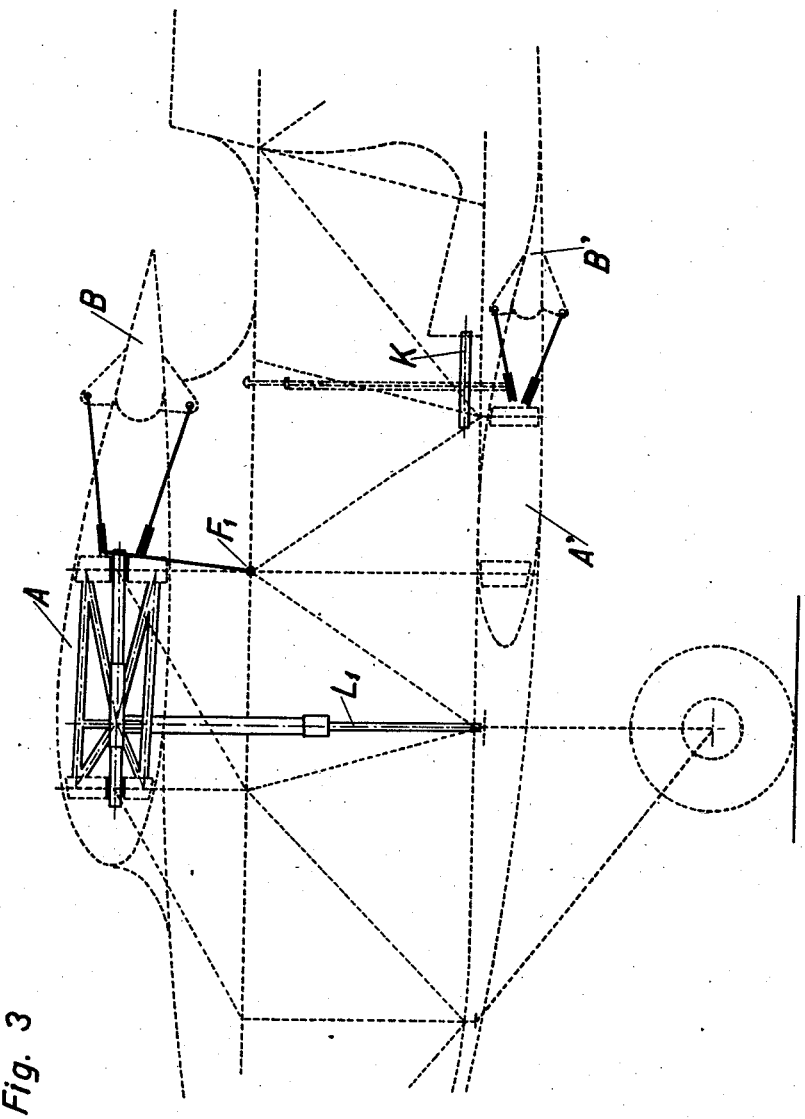
Fig. 3 is a diagrammatical partial side elevation of the aircraft, showing the already referred to and other devices.

Figs. 2 and 3 show the device provided for by the invention in order to limit the freedom of the hinged wing; said device substantially comprises a tie-rod T pivoted to the fuselage and connected through a strong elastic link R to an arm M fastened to the wing, at right angles thereto, on its centre line. The straightening moment of the system is equal to zero when the wing is in its centre position and increases with sinusoidal law as the wing deflects from its normal position.

The traverse limiting device also consists of a pair of progressive hydraulic shock absorbers $L_1$ and $L_2$ which are operative only when subjected to tension. When compressed, the liquid freely passes through an ample aperture, so that no retarding force disturbs the wing while returning into its centre position.

The invention further provides means for fastening, at the will of the pilot, the longitudinal axle K (Fig. 3) which must turn with the lateral deflections of the control stick, so as to allow of the pilot to preclude to himself the use of the ailerons of the lower wing, during long distance flight or blind flying, thus concentrating his attention on the direction of travel and the longitudinal trim of the machine and allowing the pivoted wing to automatically prevent side slip.

In embodying the invention, the following conditions will preferably be considered.

The axis of the hinge X—X is caused to pass through the centre of gravity of the hinged wing system, unless particular structural reasons prevent, in order to minimize undesirable inertia reactions during the pivoting of the wing.

A connection between the ailerons of the hinged wing and the rudder is established, to correct any yaw movements arising from the pivoting of the hinged wing.

In particular cases it will be convenient to cause the hinge axis to pass, besides through the centre of gravity of the hinged wing system, through the centre of pressure of the fuselage and the application points of the resultant aerodynamic forces on the empennages.

The invention provides the following advantages:

1—An automatic lateral stability, which is desirable with reduced or no visibility.

2—Reduced vibrations of the hinged wing, owing to the encastré mounting of the wing, at mid-length, being eliminated.

3—Reduced repercussions on the fuselage, and consequently on the crew and passengers, of the atmospheric disturbances.

4—Reduced stresses arising from uneven loading.

5—The ability to make a correct turn through the control of the rudder only, by allowing of the centrifugal force to deflect the fuselage and consequently bring the wing into its correct lateral position.

6—The ability (when the control cables of the ailerons of the hinged wing are fastened to the control stick) to make a turn without the assistance of the rudder, by compelling the wing to take a slightly banked position toward the centre of the curve. If desired, this allows of the use of the rudder being dispensed with during the flight.

The invention can also be applied in experimental research on the rolling couples by using a dynamometric apparatus to hinder the free pivoting of the wing.

Further, the invention, if applied to gliders, provides therein desirable characteristics of stability and manoeuverability in the various kinds of gliding flight.

Finally the invention may be applied to a machine capable of keeping its balance without pilot (aerial torpedo) and to various other aerodynamic researches.

I claim:

1. In airplanes or like machines having more than one complete wing extending laterally across the fuselage and including a substantially equal portion on each side of the fuselage, the said portions being fixed relative to each other, a hinge connection between one complete wing and the fuselage, to permit free deflections between them about an axis extending longitudinally of the fuselage, ailerons fitted to said hinged wing, means operatively connected to said ailerons and the fuselage, to automatically operate said ailerons upon any deflection of the fuselage with respect to the hinged wing, ailerons fitted to a fixed wing, and means to operate said ailerons by hand.

2. In airplanes or like machines having more than one complete wing extending laterally across the fuselage and including a substantially equal portion on each side of the fuselage, the said portions being fixed relative to each other, a hinge connection between one complete wing and the fuselage, to permit free deflections between them about an axis extending longitudinally of the fuselage, ailerons fitted to said hinged wing, means operatively connected to said ailerons and the fuselage, to automatically operate said ailerons upon any deflection of the fuselage with respect to the hinged wing, ailerons fitted to a fixed wing, means to operate said ailerons by hand, and means to lock the hand control means for the ailerons fitted to the fixed wing.

ALBERTO JONA.